United States Patent
Bhat

(10) Patent No.: US 7,720,786 B2
(45) Date of Patent: May 18, 2010

(54) METHOD OF PATTERN IDENTIFICATION USING RETAIN OPERATORS ON MULTISETS

(75) Inventor: Kong Posh Bhat, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 11/754,185

(22) Filed: May 25, 2007

(65) Prior Publication Data
US 2008/0294656 A1      Nov. 27, 2008

(51) Int. Cl.
G06N 5/00      (2006.01)
(52) U.S. Cl. .............................. 706/48; 76/45
(58) Field of Classification Search ................... 706/48, 706/45
See application file for complete search history.

(56) References Cited

U.S. PATENT DOCUMENTS

| 5,272,657 A | 12/1993 | Basehore et al. |
| 5,479,533 A | 12/1995 | Tanaka |
| 5,592,564 A | 1/1997 | Shigeoka et al. |
| 5,703,964 A | 12/1997 | Menon et al. |
| 6,507,829 B1 | 1/2003 | Richards et al. |

OTHER PUBLICATIONS

Hall; "Data Segmentation Algorithm Using a Decrementing Sliding Walker Chunking Approach"; U.S. Appl. No. 11/456,615, filed Jul. 11, 2006; Specification 27 pgs.; 3 Drawing Sheets (Figs. 1-3).
Kandregula, et al.; "Intelligence Engine Software Architecture"; U.S. Appl. No. 11/550,715, filed Oct. 18, 2006; Specification 26 pgs.; 3 Drawing Sheets (Figs. 1-3).

*Primary Examiner*—Wilbert L Starks, Jr.

(57) ABSTRACT

A system and method of identifying loose patterns using a smart multiset intersection operation are provided. Data segments are received from a data segmentation algorithm and sorted into corresponding multisets. A retain operation may be performed on the multisets. A normalization operation is then performed on the repeating elements in the multisets to identify the loose pattern. The loose pattern is stored in a database.

20 Claims, 8 Drawing Sheets

METHOD OF PATTERN IDENTIFICATION USING RETAIN OPERATORS ON MULTISETS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

This disclosure relates to the field of pattern recognition in artificial intelligence and more specifically to a method for pattern matching that identifies loose patterns in input data segments.

A pattern may be defined as a string that matches another string within a set of data. A string may comprise one or more characters, symbols, or expressions. Herein, characters, symbols, expressions, elements, etc. will be more generally referred to by the term "symbols". For example, the string 'ABC' may be considered a pattern in the data set 'ABCABC', and similarly in data set 'ABCddABC'. U.S. patent application Ser. No. 11/550,714, filed Oct. 18, 2006, entitled "Intelligence Engine Software Architecture", and incorporated by reference herein for all purposes, classifies patterns as "tight" or "loose". In general, tight patterns refer to strings that reoccur or repeat in a particular sequence or order within a set of data. Loose patterns refer to discrete symbols that reoccur within a set of data in a non-sequential, non-ordered manner. For example, in a data set 1, DS1=3-2-1-5-4-2 and a data set 2, DS2=1-5-0-4-3-5, the loose pattern would be 1-3-4-5.

Pattern matching algorithms, such as Rabin-Karp, Knuth-Morris-Pratt, Boyer-Moore, and other similar algorithms well known in the art are particularly efficient at identifying tight patterns in data sets. However, in data sets that contain loose patterns, conventional pattern matching algorithms are ineffective. A need exists for a pattern matching approach that can identify loose patterns in data sets.

SUMMARY

According to one embodiment, a computer-implemented method for identifying a loose pattern is provided. The method comprises receiving at least two data segments from a data segmentation algorithm and sorting the data segments into multisets having repeated elements. A retain operation may be performed on the multiset. A normalization operation is then performed on the repeated elements of each multiset. At least two data segments are input from a data segmentation algorithm with each data segment being sorted into corresponding multisets. A smart intersection operation is performed on the multisets to identify the loose patterns. The loose patterns are stored in a knowledge base of an intelligence engine.

In another embodiment, a computer readable medium comprising executable instructions for identifying a loose pattern is provided. The instructions when executed by the processor performs a method of receiving at least two data segments from a data segmentation algorithm and sorting the data segments into multisets having repeated elements. A retain operation may be performed on the multiset. A normalization operation is then performed on the repeated elements of each multiset. At least two data segments are input from a data segmentation algorithm with each data segment being sorted into a corresponding multiset. A smart intersection operation is then performed on the multisets to identify the loose patterns. The loose patterns are stored in a knowledge base of an intelligence engine.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following detailed description, taken in connection with the accompanying drawings, wherein like reference numerals represent like parts.

FIG. 2B illustrates sorted multisets using the input data segments of FIG. 2A;

FIG. 2C illustrates multiset retain operations using the sorted multisets of FIG. 2B in accordance with one embodiment of the present disclosure;

DETAILED DESCRIPTION

Figure 1:
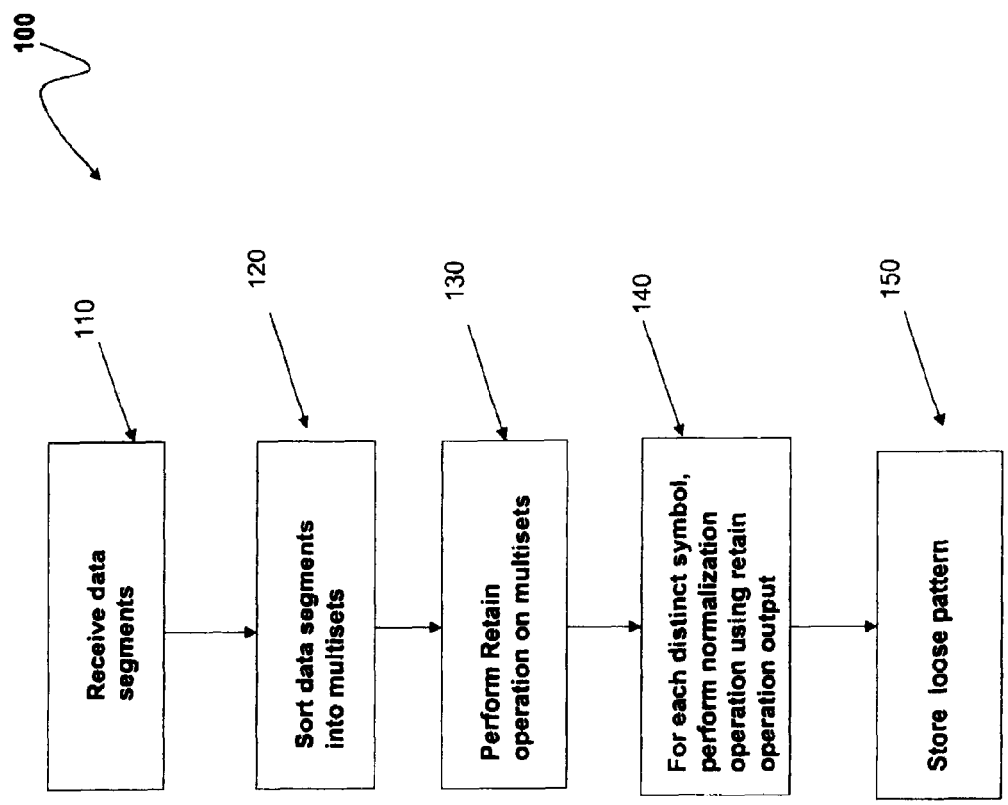
FIG. 1 is a flow chart depicting the steps involved in one embodiment of a method of loose pattern identification in accordance with the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The present disclosure provides a method of finding loose patterns in data sets. The method includes a type of set intersection operation that will be referred to herein as the smart multiset intersection operation. A multiset is a set that contains repeated instances of elements. The smart multiset intersection implementation, according to one embodiment, comprises two operations that will be referred to herein as a retain operation and a normalization operation. Details of embodiments of these operations will be described later in this disclosure. In one embodiment of the smart multiset intersection implementation, input data segments may be processed by both the retain operation and the normalization operation. In another embodiment, input data segments may be directly processed by the normalization operation. The resulting identified loose patterns are output and stored for later use.

Set intersection operations may be used to identify loose patterns in data sets. The traditional set intersection operation, represented by ∩, identifies and extracts the symbols that are common between multiple data sets. The resulting intersection set contains only symbol members common to the sets while the uncommon symbols are discarded.

A set intersection operation might begin by inputting data segments that are produced from a data stream. One particularly comprehensive approach for data stream segmentation is the decrementing sliding walker chunking technique described in U.S. patent application Ser. No. 11/456,615, filed Jul. 11, 2006, entitled "Data Segmentation Algorithm Using a Decrementing Sliding Walker Chunking Approach", herein incorporated by reference for all purposes.

The data may be any combination of characters, symbols, or elements and may be related to various events. In this disclosure, data is represented by symbol a/b, wherein "a" is an element that represents the symbol identifier and "b" represents a constraining parameter. In the embodiments of this disclosure and in the examples provided hereinafter, the constraining parameter is a timestamp. However, other constraining parameters of the input data may be used, including, but not limited to, for example, physical location, proximity, luminosity, cost, wavelength, intensity, and so on. The data may represent call codes from a telecommunications switch or base station where the timestamp indicates when an event such as a dropped call, connected call, etc., occurred. The timestamp represents a time unit, such as seconds, milliseconds, or other time unit, that gives the amount of time elapsed since some initial time.

As an example, the input data segments might consist of sets S1 and S2, the set members being:

$$S1 = \left\{ \frac{6}{1000}, \frac{12}{1013}, \frac{5}{1019}, \frac{7}{1027}, \frac{5}{1051}, \frac{4}{1068}, \right.$$
$$\left. \frac{2}{1071}, \frac{5}{1092}, \frac{1}{1095}, \frac{3}{1102}, \frac{5}{1120}, \frac{0}{1131}, \frac{5}{1140}, \frac{2}{1148} \right\},$$

$$S2 = \left\{ \frac{7}{1175}, \frac{0}{1187}, \frac{5}{1201}, \frac{14}{1205}, \frac{3}{1208}, \frac{5}{1210}, \frac{4}{1213}, \right.$$
$$\frac{16}{1217}, \frac{5}{1222}, \frac{2}{1224}, \frac{7}{1227}, \frac{3}{1229}, \frac{5}{1236}, \frac{6}{1247}, \frac{1}{1264},$$
$$\frac{5}{1278}, \frac{6}{1288}, \frac{4}{1307}, \frac{5}{1321}, \frac{0}{1339}, \frac{5}{1358}, \frac{17}{1360}, \frac{5}{1363},$$
$$\left. \frac{1}{1364}, \frac{5}{1366}, \frac{5}{1367}, \frac{3}{1371}, \frac{4}{1374}, \frac{5}{1375}, \frac{6}{1387} \right\}.$$

Temporarily ignoring the timestamp constraints, the data segments in S1 and S2 can be sorted based on symbol identifier "a" and grouped into multisets $MS_1$ and $MS_2$, respectively, displayed below:

$MS_1$={0, 1, 2, 2, 3, 4, 5, 5, 5, 5, 5, 6, 7, 12}

$MS_2$={0, 0, 1, 1, 2, 3, 3, 3, 4, 4, 4, 5, 5, 5, 5, 5, 5, 5, 5, 5, 5, 6, 6, 6, 7, 7, 14, 16, 17}

Performing the traditional set intersection operation on $MS_1$ and $MS_2$ produces a multiset MS3.

$MS3 = MS_1 \cap MS_2$ = {0, 1, 2, 3, 4, 5, 5, 5, 5, 5, 6, 7}.

The elements of multiset, MS3, constitute the potential loose pattern elements.

If the timestamp constraints are considered, however, a traditional set intersection operation would not be effective in determining the potential loose pattern elements between data sets. In cases where multiple instances of a symbol must be discarded from one or more data sets in order to identify the potential loose pattern that exists in the data, a typical set intersection operation may not provide an optimal mechanism for determining which symbol instances in multiple instance data sets are not potential candidates for the loose pattern and should be discarded.

FIG. 1 illustrates a flowchart 100 of a method according to one embodiment of the smart multiset intersection operation. The method commences with the input of data segments at block 110. The data segments may be sorted into multisets at block 120. A retain operation, embodiments of which are described in detail below, is performed on the multisets at block 130. The results of the retain operation are output to a normalization operation. At block 140, the normalization process, embodiments of which are described in detail below, operates on all the repeated element instances of the multisets. The normalization operation continues until all the repeated elements have been normalized. The resulting identified loose patterns are then output and stored to a database at block 150.

Figure 2A:
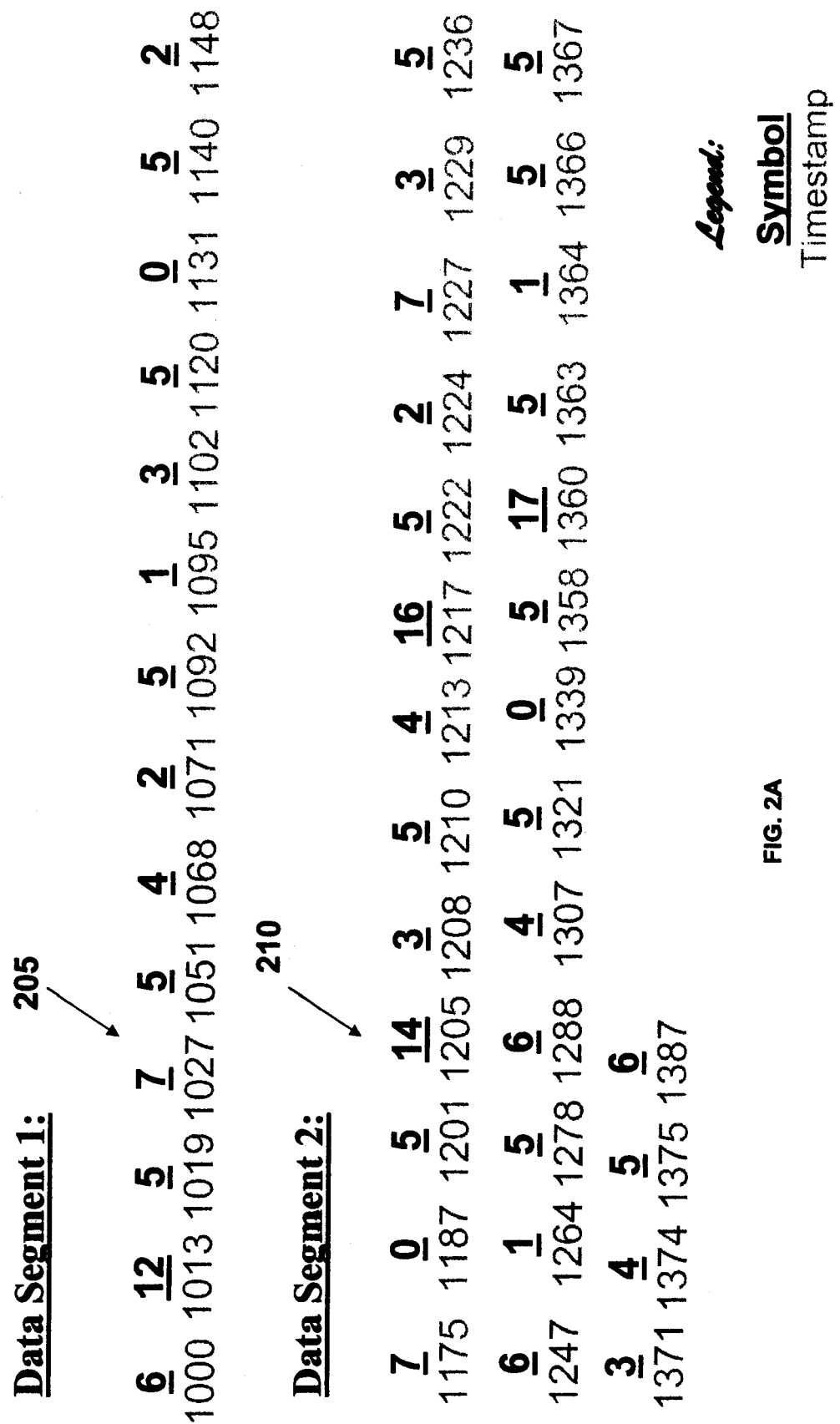
FIG. 2A illustrates data input segment in accordance with an embodiment of the present disclosure.

FIG. 2A depicts input data segment 1 (S1) section 205 and input data segment 2 (S2) section 210. Ignoring the constraint, which in this example is the timestamp, data segments 1 and 2 are sorted and grouped into multisets MS4 and MS5, respectively. FIG. 2B, block 220, illustrates the sorted multisets, MS4 and MS5, respectively, on which the retain operation is performed.

The retain operation, represented by operator $\stackrel{\circ}{\cap}$, eliminates all non-common elements between multisets. FIG. 2C, blocks 230 and 240, illustrates the multiset retain operations. The output of an A $\stackrel{\circ}{\cap}$ B operation is a set of all those elements in A which are also in B. As the retain operation is non-commutative, the result MS6, at 230, of the set operation multiset MS4 retain multiset MS5, MS4$\stackrel{\circ}{\cap}$MS5, and the result MS7, at 240, of the set operation multiset MS5 retain multiset MS4, MS5$\stackrel{\circ}{\cap}$MS4, differ. The results of the retain operations, MS6 230 and MS7 240, are input to the normalization operation.

The normalization operation equalizes the number of instances of each symbol within the multisets and determines which repeating symbols in each respective multiset to discard, based on the data constraint parameters. Using the data elements resulting from the retain operation together with their corresponding data constraints, the normalization operation operates on subsets of each respective multiset. The subsets comprise one or more instances of a symbol which consists of the data element and its corresponding data constraints. Specifically, the subsets of MS6 230 would be (0), (1), (2,2), (3), (4), (5,5,5,5,5), (6), and (7). The subsets of MS7 240 would be (0,0), (1,1), (2), (3,3,3), (4,4,4), (5,5,5,5,5,5,5, 5,5,5,5), (6,6,6), and (7,7).

Subsets that contain matching symbols can be referred to as corresponding subsets. For example, the subset (0) in MS6 230 and the subset (0,0) in MS7 240 would be corresponding subsets, as would subset (1) in MS6 230 and subset (1,1) in MS7 240, subset (2,2) in MS6 230 and subset (2) in MS7 240, and so on.

For any pair of corresponding subsets, the subset containing the least number of instances of the repeating symbol may be designated as a benchmark subset for that pair of corresponding subsets. For example, for the corresponding subsets (0) in MS6 230 and (0,0) in MS7 240, the benchmark subset would be the subset (0) in MS6 230. For the corresponding subsets (2,2) in MS6 230 and (2) in MS7 240, the benchmark subset would be the subset (2) in MS7 240. It can be seen that the benchmark subset may occur in MS6 230 for some symbols and in MS7 240 for other symbols.

The normalization operation reduces the number of instances of the symbols within each pair of corresponding subsets to equal the number of symbol instances in the benchmark subset for that pair of corresponding subsets. For example, at FIG. 3A, section 310, subset MS6, comprises five symbol instances, i.e., five instances of the element 5 along with the respective corresponding timestamps. Subset MS7 comprises eleven symbol instances of element 5. Subset MS6, which contains the least number of instances of the element 5, i.e. five instances, is the benchmark subset. Therefore the number of instances in both subset MS6 and subset MS7 will be "normalized" to equal five instances. During normalization, six of the eleven instances in subset MS7 will be eliminated to equalize the number of instances between the benchmark subset MS6 and subset MS7.

Figure 3A:
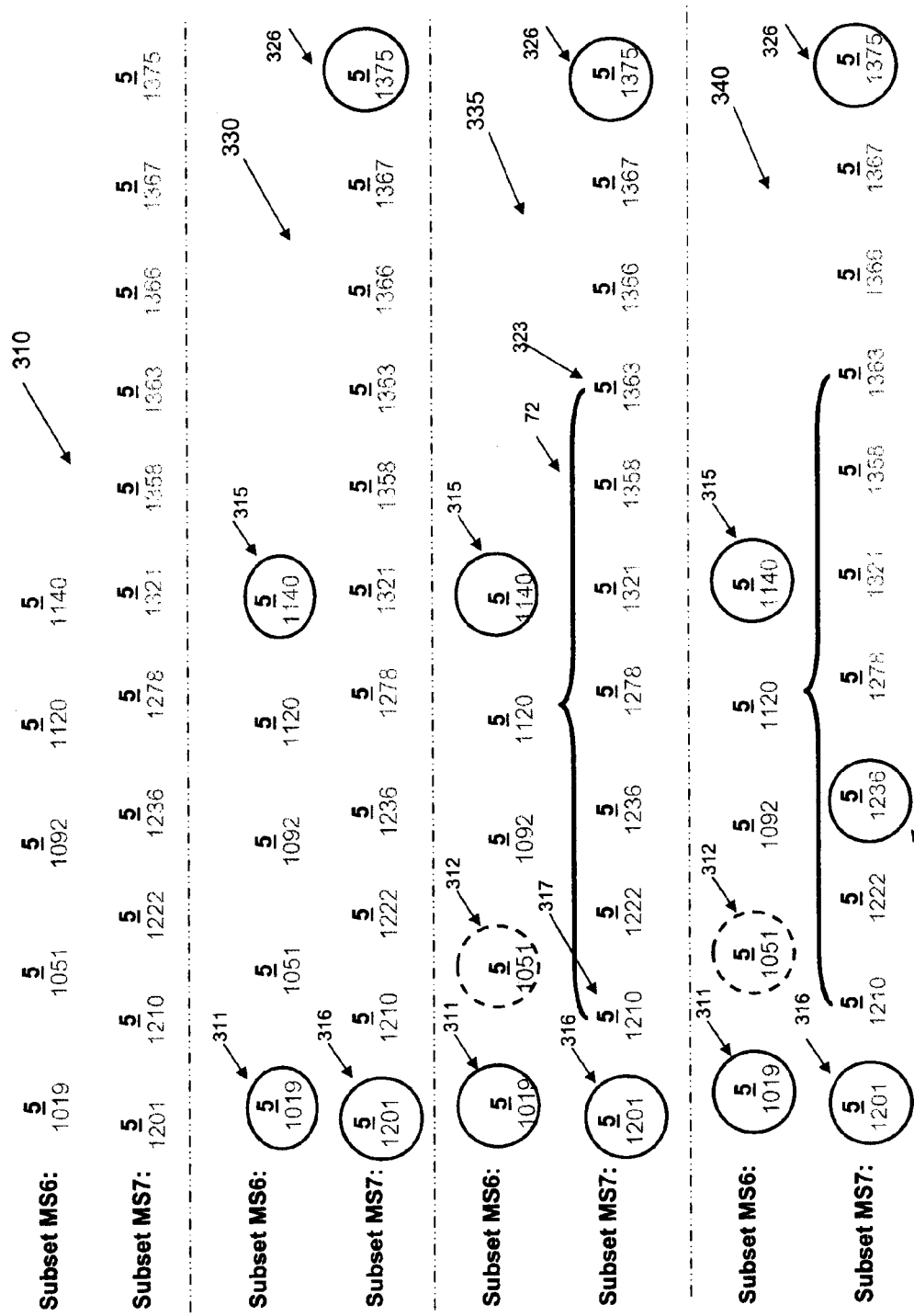
FIGS. 3A, 3B, and 3C depict a normalization operation process in accordance with one embodiment of the present disclosure.
Figure 3B:
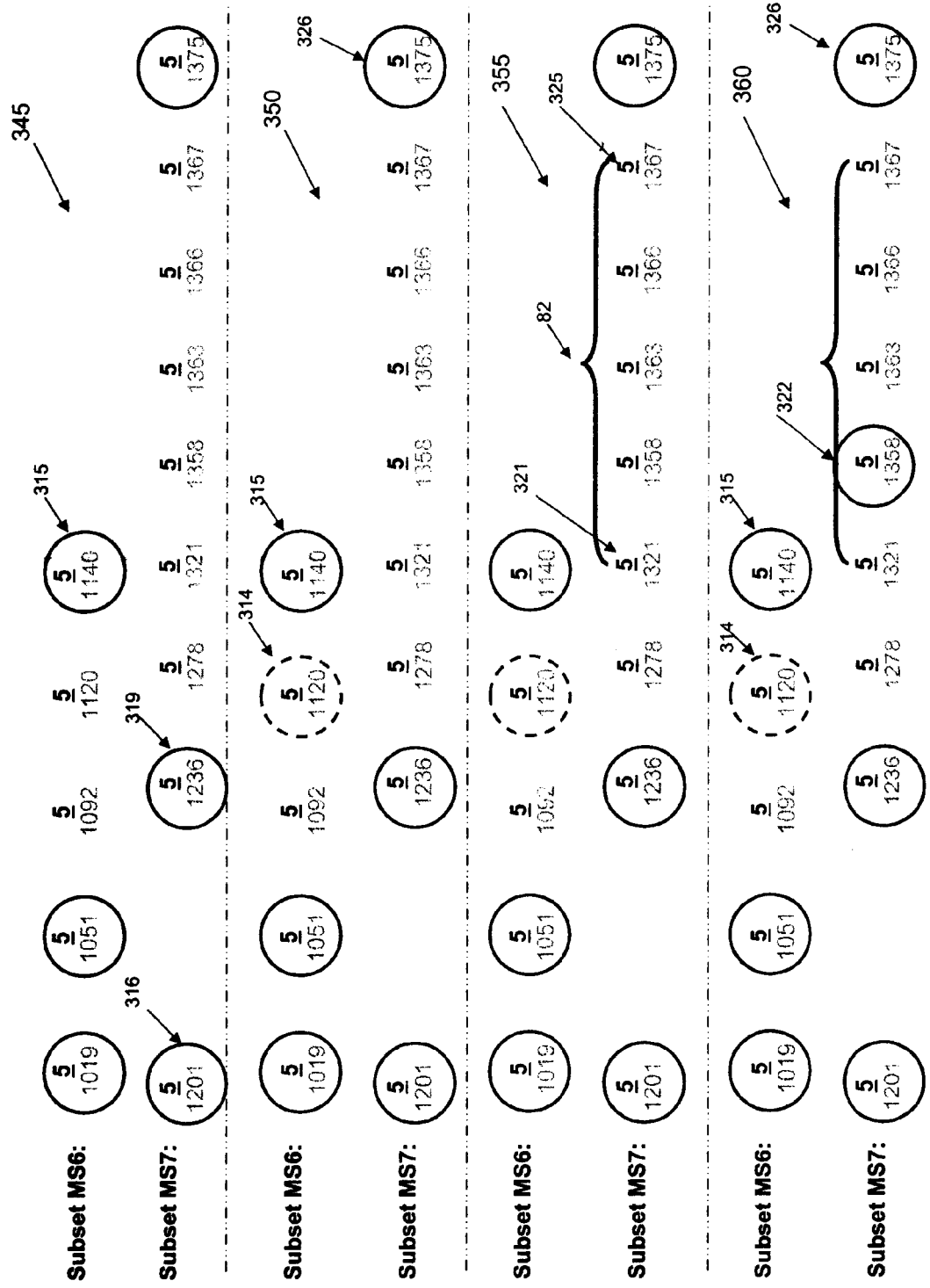
Figure 3C:
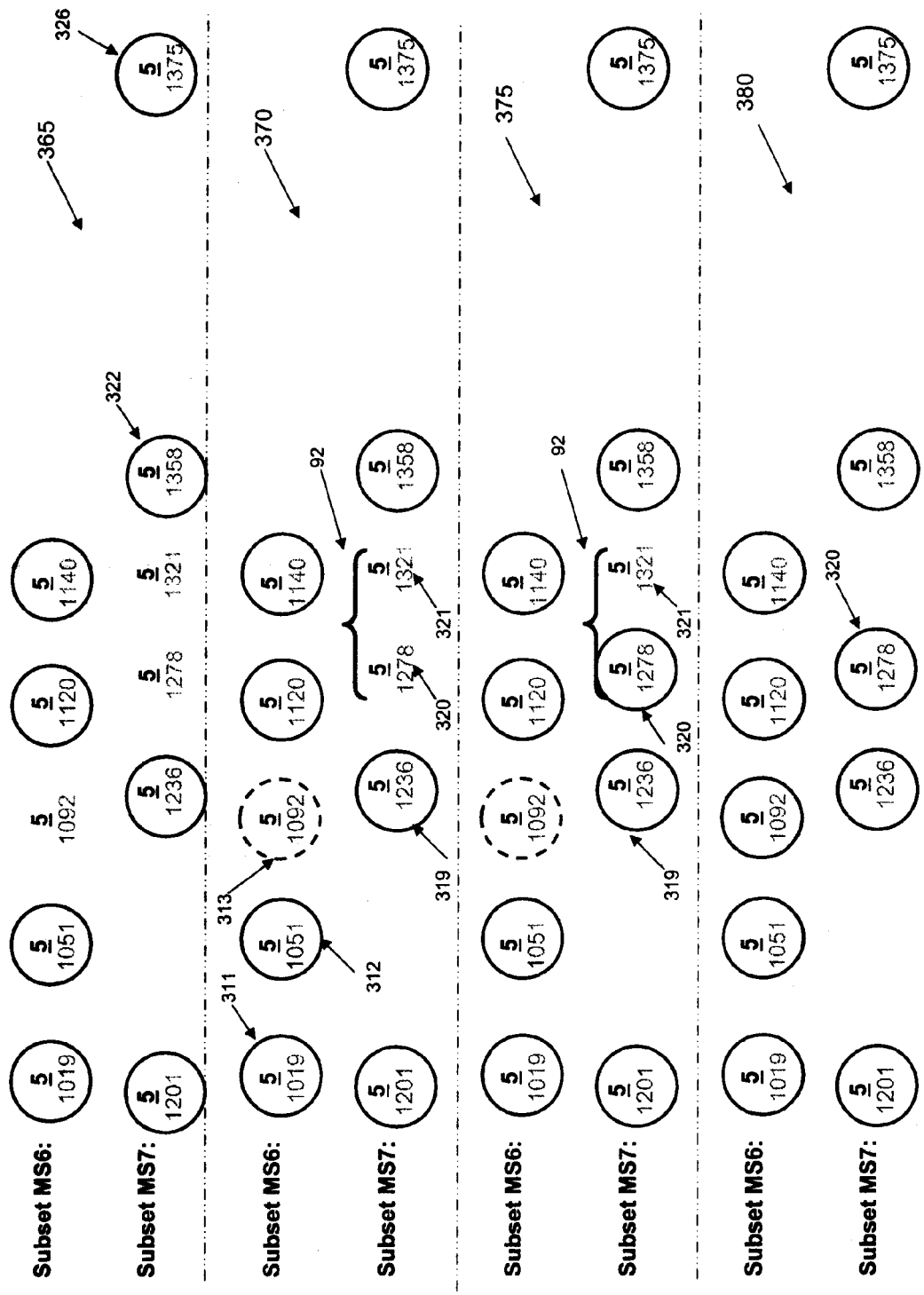

One preferred embodiment of the normalization process is illustrated at FIGS. 3A-3C. Exemplary subsets of multisets MS6 and MS7, subsets MS6 and MS7, are formed using the repeating element "5" with corresponding timestamps. The normalization operation commences with the identification of data segments at the beginning and end of the data. At FIG. 3A, section 330, the very first and very last instances of the symbols from subset MS6 and subset MS7 are identified. At 330, the first and last symbols identified from subset MS6 are $$\frac{5}{1019}311 \text{ and } \frac{5}{1140}315,$$

respectively; the first and last symbols identified in subset MS7 are $$\frac{5}{1201}316 \text{ and } \frac{5}{1375}326,$$

respectively. Data may be skewed in one direction, so to balance out the data, the normalization operation starts at one end of the data and alternates between the two ends of data until normalization is complete.

Starting at one end of the data, either the beginning or the end, normalization continues with selecting a subset with the least number of instances, the benchmark subset, and determining the time (or constraining parameter) difference between a first identified symbol in the subset and its directly adjacent symbol. The other subsets use this determined time difference, which may be referred to as the benchmark time difference, to determine the next adjacent symbol in each subset after the first identified symbol. The next adjacent symbol in each subset will be the symbol having a time difference that is closest in value, i.e. closely matches, to the benchmark time difference. This next adjacent symbol is selected from a newly defined set of instances within the subset. The time differences between the first identified symbol and each instance within the newly defined set is evaluated and the instance that corresponds with a time difference closest to the benchmark time difference is selected as the next adjacent symbol. Any symbols between the first identified symbol and the next adjacent symbol are then eliminated. Therefore, the number of instances within the newly defined set must not be so large that the number of symbols remaining in the subset after elimination is less than the benchmark subset. Likewise, the number of instances within the newly defined set cannot be so small that the number of symbols remaining in the subset after normalization is complete is greater than the benchmark subset.

At section 335, the benchmark time difference in subset MS6 between $$\frac{5}{1019}311 \text{ and } \frac{5}{1051}312$$

is evaluated to be 32 time units (1051 minus 1019). Therefore, in subset MS7, the next adjacent symbol after the first identified symbol $$\frac{5}{1201}316$$

may be determined by finding an instance of the symbol 5 whose time difference with $$\frac{5}{1201}316$$

closely matches the benchmark time difference of 32 time units that exists between $$\frac{5}{1019}311 \text{ and } \frac{5}{1051}312$$

in subset MS6.

At section 335, in subset MS7, a set of symbols is defined at 72. The defined set 72 in subset MS7 contains symbols spanning the range from $$\frac{5}{1210}317 \text{ to } \frac{5}{1363}323.$$

The normalization algorithm evaluates the absolute value of the timestamp differences between $$\frac{5}{1201}317$$

and each symbol member of the set 72 and selects the one symbol member from the set 72 that corresponds to the timestamp difference closest to the benchmark time difference. Only the symbols within set 72 will be evaluated. Since only one symbol member is selected from set 72, exceeding the boundaries of 72 could potentially result in an error subset that has a lesser number of symbols than the benchmark subset after normalization is complete. Similarly, shrinking the boundaries of 72 by reducing the number of symbols it contains could potentially result in an error subset that has a greater number of symbols than the benchmark subset after normalization is complete.

At 340, the closest match to the benchmark time difference of 32 time units, between the symbols $\frac{5}{1019}311$ and $\frac{5}{1051}312$ in $MS6$, is determined to be 35 time units, which is the timestamp difference between symbol $$\frac{5}{1201}316$$

and the symbol $$\frac{5}{1236}319$$

i.e. (1236 minus 1201). At 345, in subset MS7, the symbol corresponding with the timestamp difference of 35 time units is retained as the next adjacent symbol, $$\frac{5}{1236}319,$$

and the intervening symbols between $$\frac{5}{1201}316 \text{ and } \frac{5}{1236}319,$$

which are $$\frac{5}{1210} \text{ and } \frac{5}{1222},$$

are eliminated or discarded.

At 350, the normalization algorithm then moves to the other end of the symbol data in subsets MS6 and MS7. The benchmark time difference between the last identified symbol in the MS6 data, $$\frac{5}{1140}315$$

and its directly adjacent symbol $$\frac{5}{1120}314,$$

is evaluated and determined to be to 20 time units. Therefore, in subset MS7, the next adjacent symbol to the last identified symbol in the subset $$\frac{5}{1375}326,$$

will be the symbol that corresponds with the closest match to the benchmark time difference.

At section 355, in subset MS7, a set 82 of symbols is again defined. Again, only the symbols within the boundaries of subset 82 will be considered for potential matches because exceeding those boundaries could potentially result in elimination of too many symbols and a subset that is less than or exceeds the number of symbols in the benchmark subset after normalization is complete. The defined set 82 in subset MS7 contains symbols spanning the range from $$\frac{5}{1321}321 \text{ to } \frac{5}{1367}325.$$

Again, the normalization algorithm determines which symbol in set 82 closely matches the benchmark time difference by evaluating the absolute value of the timestamp differences between $$\frac{5}{1375}326$$

and each respective member of the set 82.

At section 360, the closest match to the benchmark time difference is determined to be 17 time units, and this difference corresponds with symbol $$\frac{5}{1358}322.$$

Specifically, the absolute value of the time difference between $$\frac{5}{1375}326 \text{ and } \frac{5}{1358}322$$

is 17 time units and this value is the closest value to the benchmark time difference of 20 time units which was determined in subset MS6, between $$\frac{5}{1140}315 \text{ and } \frac{5}{1120}314.$$

At FIG. 3C, section 365, the intervening symbols between $$\frac{5}{1358}322 \text{ and } \frac{5}{1375}326,$$

which are $\frac{5}{1363}$, $\frac{5}{1366}$ and $\frac{5}{1367}$, are eliminated or discarded.

At section 365, subset MS7 now contains six symbols and therefore one additional symbol must be eliminated before subset MS7 is equivalent in size to the benchmark subset MS6, thereby completing the normalization process for the symbols with the element 5. The normalization operation alternates between the two ends of data in each subset and identifies for the operation the symbols in consecutive order. At section 370, the normalization process alternates to the other end of the data in subsets MS6 and MS7. In MS6, the last normalization operation on this end of the data identified symbol $$\frac{5}{1019}311.$$

Therefore, the next consecutive symbol identified for the normalization operation on this end of the data is $$\frac{5}{1051}312.$$

The benchmark time difference between the next identified symbol $$\frac{5}{1051}312$$

and its directly adjacent neighbor, symbol $$\frac{5}{1092}313$$

is evaluated as 41 time units. Therefore, in subset MS7, the selected adjacent symbol to the next identified symbol $$\frac{5}{1236}319$$

will be the symbol where the difference between the next identified symbol and the selected adjacent symbol is closest in value to the benchmark time difference of 41 time units.

A set of symbols is again defined at 92 in subset MS7. The adjacent symbol will be selected from this set. The defined set 92 in MS7 contains symbols spanning the range from $$\frac{5}{1278}320 \text{ to } \frac{5}{1321}321.$$

The normalization algorithm evaluates the absolute value of the timestamp differences between the identified symbol $$\frac{5}{1236}319$$

and each respective member of the subset 92. At 375, the closest match to the benchmark time difference of 41 time units is determined to be the absolute value of the time difference between $$\frac{5}{1236}319 \text{ and } \frac{5}{1278}320$$

which is 42 time units. At section 380, in subset MS7, the symbol corresponding to the closest benchmark time difference, $$\frac{5}{1278}320,$$

is retained as the next adjacent symbol and the intervening symbol, $$\frac{5}{1321}321,$$

is discarded.

When the number of instances of symbol 5 in subset MS6 equals the number of instances in subset MS7, the normalization operation terminates for symbol 5. The normalization procedure will be performed between multisets for every element where the number of instances of an element is three or more and the number of instances of an element varies between multisets. So, for example, for multisets MS6 and MS7, subsets for elements 0, 1, 2, 3, 4, 5, 6, and 7 will be formed because the number of instances of these elements are different within the multisets. Therefore, the normalization operation will be performed on the subsets of each respective element.

In embodiments where the numbers of instances of a given element in the multisets are the same, no normalization processing is required and the instances of each subset symbol are automatically included in the final pattern. In embodiments where there are no constraints to consider, such as the timestamp, a random selection of the instances to include in each subset to match the number of instances in the benchmark subset is performed. The normalization algorithm repeats until the two multisets are normalized with respect to all the elements in each multiset.

In the cases where the number of instances of an element in a multiset is less than three, the normalization procedure degenerates into a no-op procedure. For example, if a symbol appeared exactly once or exactly twice in both subsets, then a match between the symbols would already exist and there would be no need to perform the normalization procedure. If a symbol appeared once in one subset and twice in the other, then one of the symbols in the subset with two instances of the symbol could match at random with the symbol in the subset with one instance of the symbol.

At the completion of the normalization operation for all the elements, the number of elements in multiset MS6 and MS7 should be equal and their corresponding symbols, the elements with the timestamp constraint, are considered to be loose patterns. The loose patterns may then be stored in a database for future processing or use.

In some embodiments, elimination of symbols that appear in only one multiset may occur as part of the normalization operation rather than in a separate retain operation and the retain operation may be omitted. That is, if the normalization operation were attempted on a symbol that occurs in one multiset but does not occur in another, the normalization operation would fail and the symbol could be eliminated. This could have a similar effect to performing the retain operation.

In some embodiments, further processing after normalization may be performed to determine the validity of the loose patterns based on a constraining parameter. This post normalization processing, referred to hereinafter as the Time Winnowing Algorithm, may be applied to loose patterns to identify and discard, or winnow out, symbols that do not meet the predetermined constraining parameter. As mentioned previously, the constraining parameter might be a timestamp, a physical location, a proximity, a luminosity, a cost, a wavelength, an intensity, and so on. For ease of reference, the constraining parameter will be referred to hereinafter as a timestamp or a timing constraint.

In the Time Winnowing Algorithm, the timing constraint may be provided in terms of an "order of magnitude" (OOM) factor, f. In the loose patterns determined after the normalization process, if the ratio of the difference between the timestamps of any two symbols in the pattern exceeds or is less than a certain range factor, then the symbol is eliminated from the loose pattern. In some embodiments, the ratio of the difference between timestamps in the loose pattern must satisfy a timing constraint that must not be less than the ratio of 1/f or greater than f.

The Time Winnowing algorithm timing constraint may be expressed mathematically: Let f be the order of magnitude factor and ts (i, Pj) be the timestamp of symbol i in pattern Pj. Then the timing constraint may be expressed, for all symbols a, b in set $P_1$ and all symbols a, b in set $P_2$, as:

$$\forall a,b \in P_1 \; \forall a,b \in P_2,$$

$$\frac{1}{f} \leq \frac{|ts(a, P_1) - ts(b, P_1)|}{|ts(a, P_2) - ts(b, P_2)|} \leq f$$

In other words, the ratio of the difference in the timestamps of any two symbols, for example, a and b, in patterns P1 and P2 lies between 1/f and f. Symbols which fail to satisfy the timing constraints are removed from the identified patterns.

Figure 4:
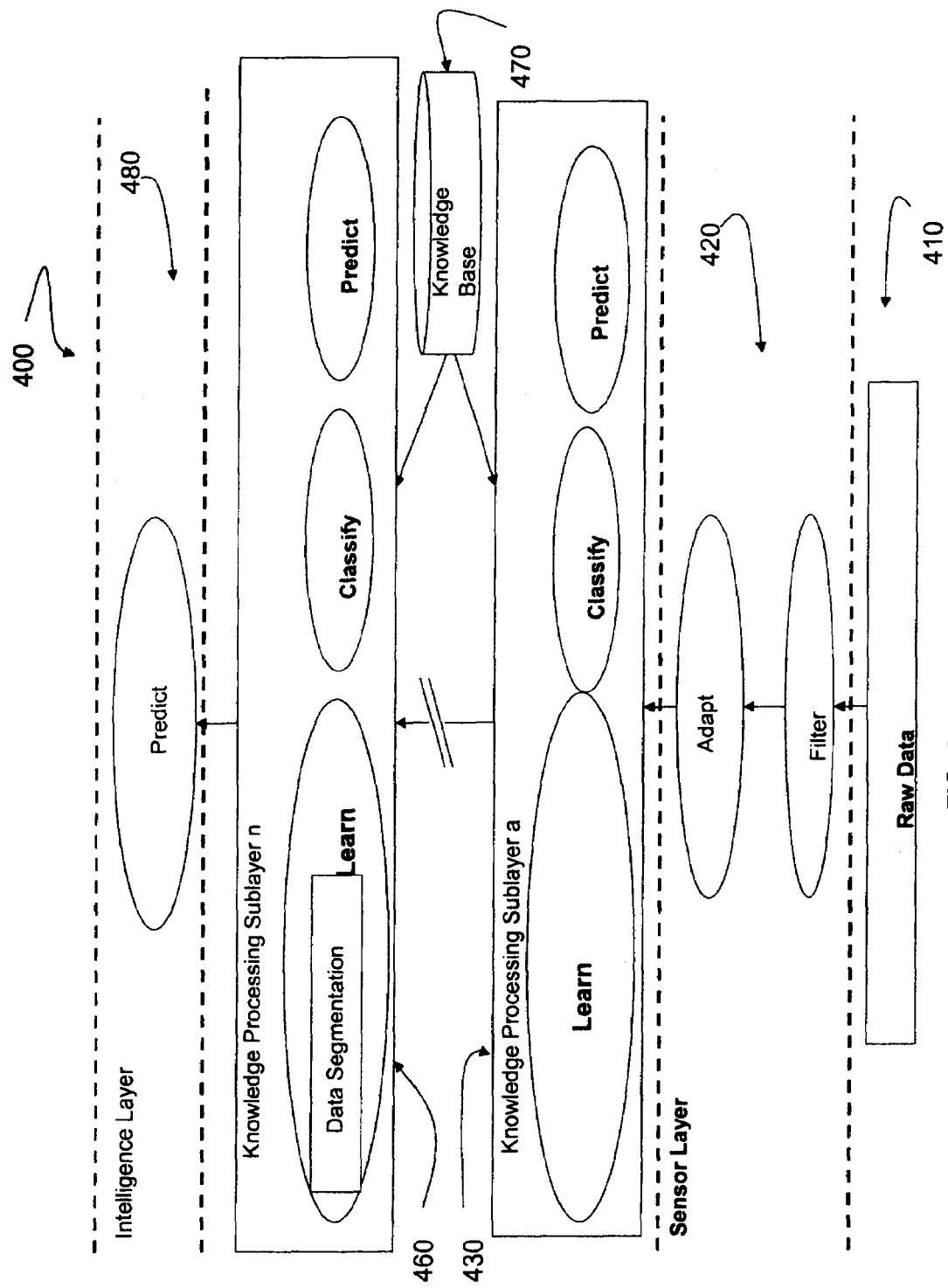
FIG. 4 illustrates a system in accordance with another embodiment of the present disclosure that uses the output of the method of the present disclosure.

FIG. 4 illustrates a block diagram of an embodiment of a system 400 in accordance with an embodiment of the present disclosure. The system 400 is a cortical intelligence engine software architecture 400 which may utilize the output of the method of the current disclosure. It should be understood that the system 400 is merely one example of an application that could make use of the loose pattern identification procedure and that use of the procedure in other settings is not precluded.

An intelligence engine receives data related to various events and attempts to detect patterns in the data. From the patterns, the intelligence engine can learn about the environment in which events occurred and can predict near-term future events based on the learned information. The intelligence engine may cause certain actions to be taken based on the predictions. Intelligent engines have been used in applications such as ubiquitous networks, smart homes, handset personalization, image recognition, visual security, biometrics, intelligent and proactive operations, administration and maintenance & provisioning (OAM&P) systems, cognitive radio spectrum management, context-aware mobility management, gesture recognition, social networks, prediction of user preferences and actions, and other applications.

One embodiment of intelligence engine software architecture is further described in U.S. patent application Ser. No. 11/550,714, filed Oct. 18, 2006, entitled "Intelligence Engine Software Architecture", which is herein incorporated by reference for all purposes. The intelligence engine software architecture 400 embodies real-like intelligence by deriving its fundamental principles from the anatomy of the neocortex. Cortical design techniques such as a multi-layer hierarchical architecture, sensory input, learning of patterns from real world input, pattern aggregation, feedback, feed forward, source tracking, and a hierarchical memory are combined with advance mathematical algorithms to develop a generic and advance intelligence engine architecture.

The system 400 architecture consists of a sensor layer 420, one or more knowledge processing layers 430-460, and an intelligence layer 480. The sensor layer 420 receives input data 410 from a plurality of domains and converts the input data into a domain-independent format. The knowledge processing layers 430-460 include a knowledge base 470 which functions as a repository of the identified patterns. As the method of the current disclosure identifies loose patterns, they are stored in the knowledge base 470 of the knowledge processing layer 430. In essence, the method of the current disclosure provides a practical result, loose patterns, for a system 400 which may be the cortical intelligence engine. The intelligence layer 480 may then make a prediction about future events, such as anticipating or predicting system failures based on an analysis of dropped calls, based on comparisons of input data to the identified patterns.

Figure 5:
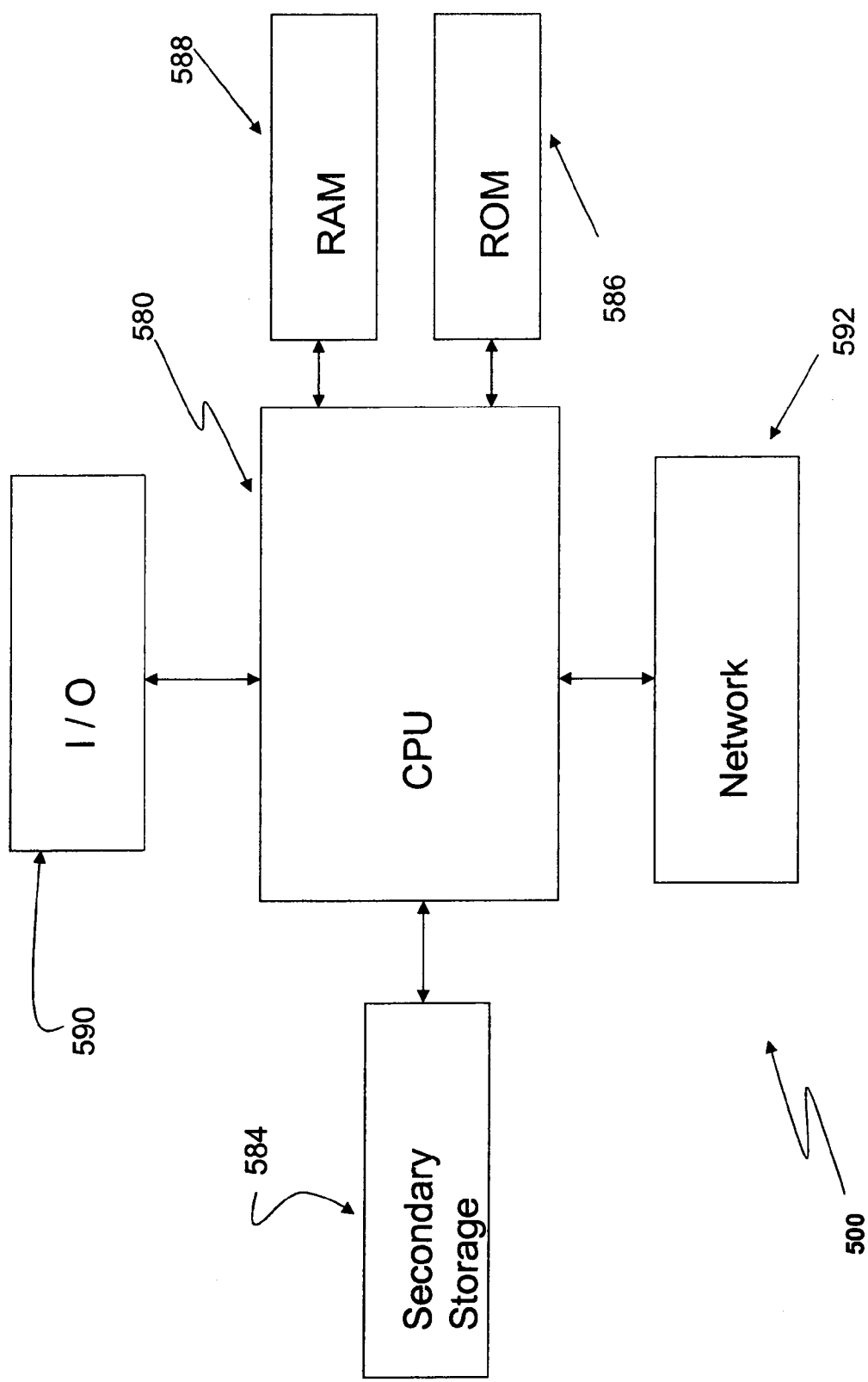
FIG. 5 illustrates an exemplary general purpose computer system suitable for implementing the embodiments of the present disclosure.

The system described above may be implemented on any general-purpose computer with sufficient processing power, memory resources, and network throughput capability to handle the necessary workload placed upon it. FIG. 5 illustrates a typical, general-purpose computer system 500 suitable for implementing one or more embodiments disclosed herein. The computer system 500 includes a processor 580 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 384.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 580 to communicate with an Internet or one or more intranets. With such a network connection, it is contemplated that the processor 580 might receive information from the network, or might output information to the network in the course of performing the above-described method steps. This information, which is often represented as a sequence of instructions to be executed using processor 580, may be received from and outputted to the network.

The processor 580 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of identifying a loose pattern comprising:
   receiving at least two data segments from a data segmentation algorithm;
   sorting the data segments into multisets, the multisets comprising data elements that have multiple instances;
   performing a retain operation on each multiset to obtain a resulting multiset wherein performing the retain operation on each multiset comprises performing the retain operation, designated by operator $\barwedge$, on a first multiset, MS1 and a second multiset, MS2, wherein MS1 retain MS2, MS1 $\barwedge$ MS2, eliminates elements in MS1 that do not appear in MS2, and MS2 retain MS1, MS2 $\barwedge$ MS1, eliminates elements in MS2 that do not appear in MS1;
   performing a normalization operation using the resulting multisets to identify a loose pattern; and
   storing the identified loose pattern in a database.

2. The computer-implemented method of claim 1, wherein the data segments comprise a constraining parameter associated with each data element.

3. The computer-implemented method of claim 2, wherein the constraining parameter is selected from a group consisting of one or more of timestamp, proximity, luminosity, and cost.

4. The computer-implemented method of claim 3, further comprising winnowing out symbols that do not meet a predetermined constraining parameter by applying a formula:

$$\frac{1}{f} \le \frac{|ts(a, P_1) - ts(b, P_1)|}{|ts(a, P_2) - ts(b, P_2)|} \le f,$$

wherein ts(i, Pj) is the constraining parameter of symbol i in pattern Pj wherein a, b, represent symbols and f represents an order of magnitude factor.

5. The computer-implemented method of claim 3, wherein the normalization operation further comprises:
   identifying symbol instances, the symbol instances comprising data element instances in the resulting multisets along with the associated constraining parameter of each data element instance;
   forming subsets of the symbol instances;
   identifying a benchmark subset from the subsets, the benchmark subset comprising a least number of symbol instances; and
   eliminating a number of symbol instances in each subset until the number of symbol instances in each subset corresponds to the number of symbol instances in the benchmark subset.

6. The computer-implemented method of claim 5, wherein the eliminating further comprises steps of:
   a) selecting a first symbol instance in the benchmark subset,
   b) identifying a second symbol instance adjacent to the selected first symbol instance in the benchmark subset;
   c) determining a benchmark difference using the constraining parameter between the first and second symbol instance;
   d) selecting a third symbol instance in each one of the subsets, other than the benchmark subset;
   e) defining a new set of symbol instances within the subset, the new set of symbol instances being in a consecutive order adjacent to the third symbol instance;
   f) evaluating a constraining parameter difference between the third symbol instance and each one of the symbol instances in the newly defined set of symbol instances;
   g) retaining a fourth symbol instance in the newly defined set of symbol instances where the evaluated constraining parameter difference is closest to the benchmark constraining parameter difference;
   i) eliminating the symbol instances in the new defined set that are not retained;
   j) selecting a fifth symbol instance in the benchmark subset, if the number of symbol instances in each subset and the benchmark subset are not equal; and
   k) performing steps b through k until the number of element instances in each subset and the benchmark subset are equal.

7. The computer-implemented method of claim 6, wherein the selected symbol instance in the benchmark subset and the selected symbol instance in each one of the subsets is either at a beginning or end of the multiset.

8. The computer-implemented method of claim 1, wherein the database is a knowledge base that is a component of an intelligence engine comprising:
   a sensor layer for receiving input data;

one or more knowledge processing layers for identifying a loose pattern in the data segments, wherein the knowledge processing layer further comprises the knowledge database for storing and retrieving the identified loose pattern; and an intelligence layer, wherein the intelligence layer comprises a prediction module, wherein the prediction module receives the identified loose pattern processed by the knowledge processing layers and produces a prediction based on the identified loose pattern.

9. A computer-implemented method of identifying a loose pattern comprising:
   receiving at least two data segments from a data segmentation algorithm;
   sorting the data segments into multisets, the multisets comprising data elements that have multiple instances;
   performing a retain operation on each multiset to obtain a resulting multiset wherein performing the retain operation on each multiset comprises performing the retain operation, designated by operator $\stackrel{\circ}{\cap}$, on a first multiset, MS1 and a second multiset, MS2, wherein MS1 retain MS2, MS1 $\stackrel{\circ}{\cap}$MS2, eliminates elements in MS1 that do not appear in MS2, and MS2 retain MS1, MS2 $\stackrel{\circ}{\cap}$MS1, eliminates elements in MS2 that do not appear in MS1;
   performing a normalization operation using the sorted multisets to identify a loose pattern; and
   storing the identified loose pattern in a database.

10. The computer-implemented method of identifying a loose pattern of claim 9, wherein the data segments comprise a constraining parameter associated with the data elements.

11. The computer-implemented method of identifying a loose pattern of claim 10, wherein the constraining parameter is selected from a group consisting of one or more of timestamp, proximity, luminosity, and cost.

12. A computer readable medium comprising executable instructions for identifying a loose pattern, the instructions, when executed by a processor, performing a method of:
   receiving at least two data segments from a data segmentation algorithm;
   sorting the data segments into multisets, the multisets comprising data elements that have multiple instances;
   performing a retain operation on each multiset to obtain a resulting multiset wherein performing the retain operation on each multiset comprises performing the retain operation, designated by operator $\stackrel{\circ}{\cap}$, on a first multiset, MS1 and a second multiset, MS2, wherein MS1 retain MS2, MS1 $\stackrel{\circ}{\cap}$MS2, eliminates elements in MS1 that do not appear in MS2, and MS2 retain MS1, MS2 $\stackrel{\circ}{\cap}$MS1, eliminates elements in MS2 that do not appear in MS1;
   performing a normalization operation using the resulting multisets to identify a loose pattern; and
   storing the identified loose pattern in a database.

13. The computer readable medium of claim 12, wherein the data segments comprise a constraining parameter associated with the data elements.

14. The computer readable medium of claim 13, wherein the constraining parameter is selected from a group consisting of one or more of timestamp, proximity, luminosity, and cost.

15. The computer readable medium of claim 14, wherein the normalization operation further comprises:
   identifying symbol instances, the symbol instances comprising data element instances in the resulting multisets along with the associated constraining parameter of each data element instance;
   forming subsets of the symbol instances;
   identifying a benchmark subset from the subsets, the benchmark subset comprising a least number of symbol instances; and
   eliminating a number of symbol instances in each subset until the number of symbol instances in each subset corresponds to the number of symbol instances in the benchmark subset.

16. The computer readable medium of claim 15, wherein the eliminating further comprises steps of:
   a) selecting a first symbol instance in the benchmark subset,
   b) identifying a second symbol instance adjacent to the selected first symbol instance in the benchmark subset;
   c) determining a benchmark time difference between the first and second symbol instance;
   d) selecting a third symbol instance in each one of the subsets, other than the benchmark subset;
   e) defining a new set of symbol instances within the subset, the new set of symbol instances being in a consecutive order adjacent to the third symbol instance;
   f) evaluating a time difference between the third symbol instance and each one of the symbol instances in the newly defined set of symbol instances;
   g) retaining a fourth symbol instance in the newly defined set of symbol instances where the evaluated time difference is closest to the benchmark time difference;
   i) eliminating the symbol instances in the new defined set that are not retained;
   j) selecting a fifth symbol instance in the benchmark subset, if the number of symbol instances in each subset and the benchmark subset are not equal; and
   k) performing steps b through k until the number of element instances in each subset and the benchmark subset are equal.

17. The computer readable medium of claim 15, wherein forming subsets of the symbol instances for each multiset further comprises:
   sorting the data elements of each multiset in a consecutive order;
   and if multiple instances of a single data element occur, then
   sorting the data elements based on the associated constraining parameter for the data element.

18. The computer readable medium of claim 12, further comprising winnowing out symbols that do not meet a predetermined time constraint by applying a formula:

$$\frac{1}{f} \le \frac{|ts(a, P_1) - ts(b, P_1)|}{|ts(a, P_2) - ts(b, P_2)|} \le f,$$

wherein ts(i, Pj) is the timestamp of symbol i in pattern Pj wherein a, b, represent symbols and f represents an order of magnitude factor.

19. The computer readable medium of claim 12, wherein the database is a knowledge base that is a component of an intelligence engine comprising:
   a sensor layer for receiving input data;
   one or more knowledge processing layers for identifying a loose pattern in the data segments, wherein the knowledge processing layer further comprises the knowledge database for storing and retrieving the identified loose pattern; and
   an intelligence layer, wherein the intelligence layer comprises a prediction module, wherein the prediction module receives the identified loose pattern processed by the knowledge processing layers and produces a prediction based on the identified loose pattern.

20. A computer readable medium comprising executable instructions for identifying a loose pattern, the instructions, when executed by a processor, performing a method of:
receiving at least two data segments from a data segmentation algorithm;
sorting the data segments into multisets, the multisets comprising data elements that have multiple instances;
performing a retain operation on each multiset to obtain a resulting multiset wherein performing the retain operation on each multiset comprises performing the retain operation, designated by operator $\overset{\&}{\cap}$, on a first multiset, MS1 and a second multiset, MS2, wherein MS1 retain MS2, MS1 $\overset{\&}{\cap}$MS2, eliminates elements in MS1 that do not appear in MS2, and MS2 retain MS1, MS2 $\overset{\&}{\cap}$MS1, eliminates elements in MS2 that do not appear in MS1;
performing a normalization operation using the sorted multisets to identify a loose pattern; and
storing the identified loose pattern in a database.

* * * * *